United States Patent [19]

Masaki

[11] 4,380,696

[45] Apr. 19, 1983

[54] METHOD AND APPARATUS FOR MANIPULATOR WELDING APPARATUS WITH VISION CORRECTION FOR WORKPIECE SENSING

[75] Inventor: Ichiro Masaki, Brookfield, Conn.

[73] Assignee: Unimation, Inc., Danbury, Conn.

[21] Appl. No.: 206,279

[22] Filed: Nov. 12, 1980

[51] Int. Cl.³ .............................................. B23K 9/12
[52] U.S. Cl. ........................,..... 219/124.34; 219/125.1;
318/568; 414/1
[58] Field of Search ........... 219/125.1, 124.34, 124.22;
358/101, 107; 414/1; 318/568

[56] References Cited

U.S. PATENT DOCUMENTS

| | | | |
|---|---|---|---|
| 3,532,807 | 10/1970 | Webb | 358/101 |
| 4,011,437 | 3/1977 | Hohn | 318/568 |
| 4,021,840 | 5/1977 | Ellsworth et al. | 358/101 |
| 4,148,061 | 4/1979 | Lemelson | 358/101 |
| 4,255,643 | 3/1981 | Balfanz | 219/125.1 |

*Primary Examiner*—C. C. Shaw
*Attorney, Agent, or Firm*—Mason, Kolehmainen, Rathburn & Wyss

[57] ABSTRACT

Control apparatus for manipulator welding apparatus is provided that includes a vision correction system for workpiece sensing. During an initial teach mode, the manipulator is taught the desired welding path on a workpiece by the appropriate recording of data representing the welding path as an operator controls movement of the manipulator. In addition to the data representing the taught welding path, data representing a reference image or template is also recorded in the teach mode. The reference image or template data is provided by a vision system including a camera carried by the manipulator arm. As successive workpieces are presented to the manipulator for performing the desired welding path, in a repeat work cycle mode the manipulator is controlled to move in accordance with the recorded taught data in a first repeat pass wherein images of the welding seam region are detected at successive points. The vision system utilizing an image processor detects the deviation between the taught welding path and the actual welding path of the workpiece. The control apparatus in response to the deviation data provided by the image processor in the first repeat pass corrects the recorded taught data to provide corrected welding path data for the particular workpiece orientation and geometry encountered by the manipulator. During a second repeat pass of the repeat work cycle mode, welding of the actual workpiece seam is performed in accordance with the corrected welding path data obtained in the first repeat pass.

47 Claims, 11 Drawing Figures

METHOD AND APPARATUS FOR MANIPULATOR WELDING APPARATUS WITH VISION CORRECTION FOR WORKPIECE SENSING

BACKGROUND OF THE INVENTION

1. Field of the Invention

The present invention relates generally to manipulator welding apparatus and more particularly to control apparatus utilizing a vision correction system for workpiece sensing to operate manipulator welding apparatus to visually detect the deviation between a taught welding path and the actual seam to be welded during a first step and to perform welding along the actual seam of a particular workpiece during a second step.

2. Description of the Prior Art

Various welding apparatus and vision detection systems have been proposed. For example, copending applications Ser. No. 106,039 filed by I. Masaki on Dec. 21, 1979 provides a method and apparatus for detecting any positional deviation of a workpiece from a reference position by means of a visual detection system and an image processor. Further, copending application Ser. No. 066,323 filed by I. Masaki on Aug. 14, 1979 and copending application Ser. No. 077,320 filed by I. Masaki on Sept. 20, 1979 disclose arrangements for interrupting the welding operation and performing the detection of images of the workpiece during the time that the welding is interrupted or the welding current is decreased. Further welding apparatus with control arrangements are disclosed in U.S. Pat. No. 4,115,684 which issued to T. H. Lindbom on Sept. 19, 1978, U.S. Pat. No. 4,086,522 which issued to J. F. Engelberger et al. on Apr. 25, 1978, U.S. Pat. No. 4,030,617 which issued to H. Richter on June 21, 1977, U.S. Pat. No. 4,105,937 which issued to G. Tuda et al. on Aug. 8, 1978 and copending application Ser. No. 154,439 filed by W. Perzley et al. on May 29, 1980.

While the above described arrangements are generally suitable for their intended use, it is difficult to obtain image data of the sensed workpiece during welding. Even in the arrangements where provisions are made to decrease welding current or interrupt welding to obtain images of the workpiece, optical noise in the vision system is still a problem. Further, the vision system is subjected to the welding environment with possible detrimental effects on the vision system. Additionally, if the sensing of the workpiece welding seam is performed during the actual welding of the seam, the vision system carried on the manipulator arm must be positioned near the weld tip. In addition to the vision system being exposed to the welding environment and optical noise resulting therefrom, the weld gun and vision system arrangement may cause clearance problems with obstructions on or around the workpiece and may present various obstacles to the manipulator hand being controlled to move over the welding path. Further, if image data of the workpiece is obtained during the welding operation to provide path correction data, the path computation data must be calculated during the welding process and as the manipulator arm moves over the welding path.

SUMMARY OF THE INVENTION

Accordingly it is a principal object of the present invention to provide a control method and apparatus for manipulator welding apparatus having a vision correction system for workpiece sensing that overcomes one or more of the above described disadvantages of the prior art arrangements.

It is another object of the present invention to provide a control method and apparatus for manipulator welding apparatus having a vision correction system for workpiece sensing wherein a desired welding path is taught on a workpiece during a teach mode, and for each successive workpiece presented to the manipulator a vision correction system detects the deviation between the taught path and the actual workpiece path to be welded during a first repeat pass over the workpiece, corrected path data is calculated from the deviation data that represents the desired welding path for the particular workpiece position and the corrected path data is utilized during a second repeat pass to perform the welding along the desired path.

It is another object of the present invention to provide method and apparatus for manipulator welding apparatus wherein path correction data is obtained for a particular workpiece representing the deviation between a taught path and an actual workpiece path accounting for changes in workpiece position before the manipulator performs the welding of the desired welding path.

It is a further object of the present invention to provide a manipulator hand for a manipulator arm including a vision system and a weld gun wherein the manipulator hand may be rotated to selectively position either the vision system or the weld gun at a work location.

It is another object of the present invention to provide a method and apparatus for manipulator welding apparatus with a vision correction system for performing corrections to a taught work path wherein the detection of the actual work path and the correction of taught work path data is accomplished independently of the welding of the workpiece.

It is yet another object of the present invention to provide a method and apparatus for manipulator welding apparatus utilizing a vision correction system that corrects a taught path for changes in workpiece position from a taught workpiece location during a first repeat pass over the workpiece at a relatively high speed compared to that of the welding speed and prior to the time of a second repeat pass during which the welding is accomplished in accordance with the corrected path data.

Briefly, these and other objects of the present invention are achieved by providing control apparatus for manipulator welding apparatus for accurately performing a taught welding path on successive workpieces and accounting for deviations in workpiece position from the workpiece on which the weld path was initially taught. The control apparatus includes a vision correction system for workpiece sensing. During an initial teach mode, the manipulator is taught the desired welding path on a workpiece by the appropriate recording of data representing the welding path as an operator controls movement of the manipulator. In addition to the data representing the taught welding path, data representing a reference image or template is also recorded in the teach mode. The reference image or template data is provided by a vision system including a camera carried by the manipulator arm. As successive workpieces are presented to the manipulator for performing the desired welding path, in a repeat work cycle mode the manipulator is controlled to move in accordance with the recorded taught data in a first repeat pass wherein images of the welding seam region are detected at successive points along the taught path. The vision system utilizing an image processor visually detects the deviation between the taught welding path and the actual welding path of the workpiece. The image processor by means of the visual detection in the first repeat pass provides deviation data representing the deviation between a taught standard path and the actual welding path of the workpiece. The control apparatus in response to the deviation data provided by the image processor in the first repeat pass corrects the recorded taught data to provide corrected welding path data for the particular workpiece position encountered by the manipulator. During a second repeat pass of the repeat work cycle mode, welding of the actual workpiece seam is performed in accordance with the corrected welding path data obtained in the first repeat pass. When successive workpieces are provided to the manipulator, the first and second repeat passes of the repeat mode are performed for each workpiece. During the teach mode, the manipulator is taught the desired welding path with a weld tip in the appropriate welding position. Further a camera of the vision system carried by the manipulator arm during the teach mode is appropriately positioned to provide the reference image or template. During the first repeat pass of the repeat mode, the vision system on the manipulator arm is appropriately positioned to move over the taught path. In the second repeat pass of the repeat mode, the weld gun is positioned to perform the welding. Any positional offsets between the optical center of the vision system on the manipulator arm and the weld point of the weld gun are accounted for by the control apparatus to provide appropriate data. In one arrangement, the vision system and the weld gun of the manipulator arm are provided by portions of the vision system being mounted on the manipulator arm along with the weld gun. In a first specific embodiment of this arrangement, the vision system and the weld gun are presented to the workpiece in an aligned fasion. In a second specific embodiment of this arrangement, the vision system and the weld gun are mounted on the hand with appropriate rotation of the manipulator hand at the end of the robot arm selectively presenting either the vision system or the weld gun. In another arrangement, two separate manipulator hands are provided; one hand carrying the appropriate portions of the vision system such as a camera head and an optical pattern projection unit that is utilized for detection and a second hand including the weld gun to perform the welding and to teach the desired welding path.

The invention both as to its organization and method of operation together with further objects and advantages thereof will best be understood by reference to the following specification taken in conjunction with the accompanying drawings.

DETAILED DESCRIPTION OF THE PREFERRED EMBODIMENT

Figure 1:
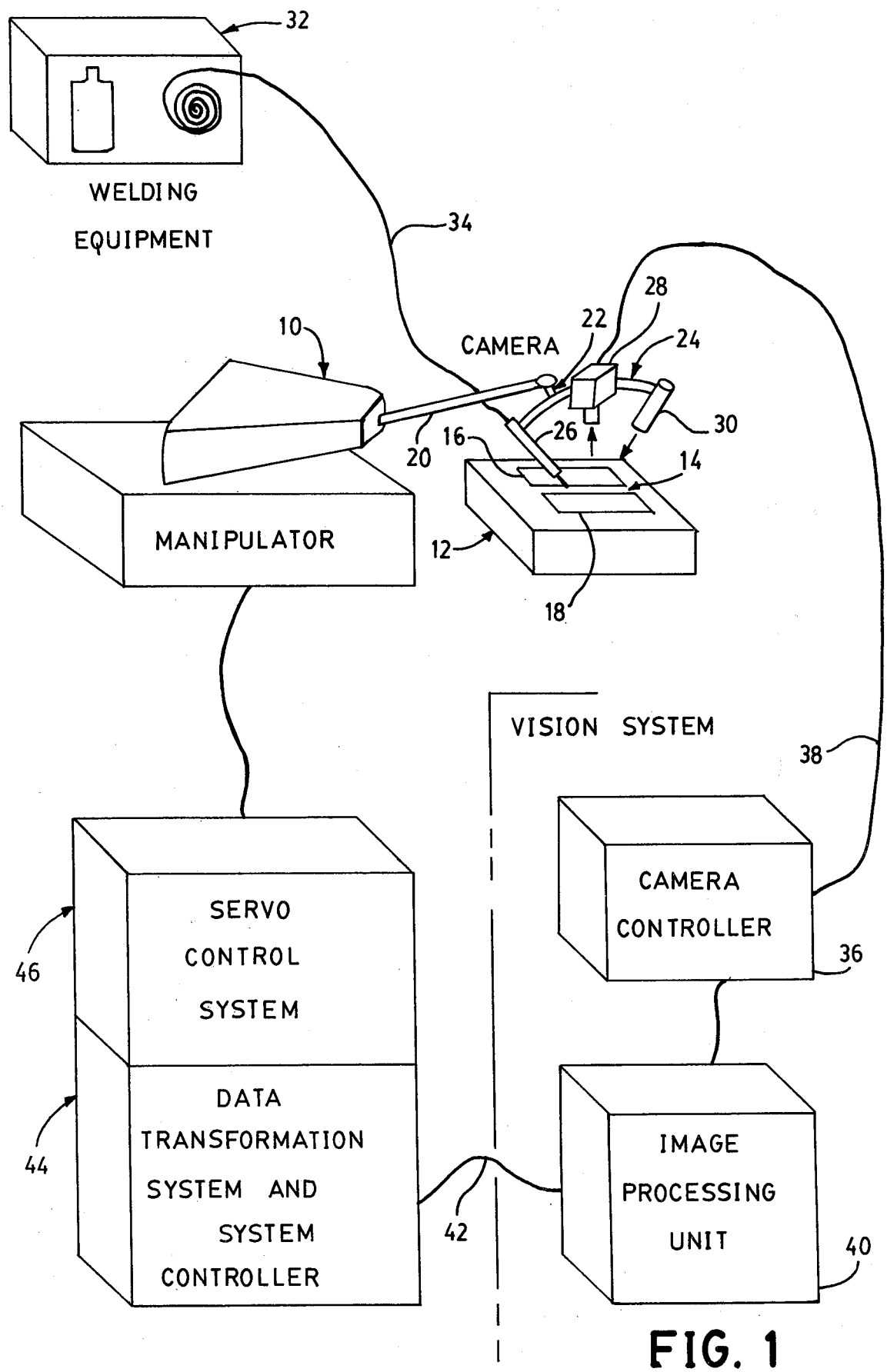
FIG. 1 is a perspective view of a programmable manipulator adjacent a workpiece welding station and a functional representation of the control apparatus of the present invention.

Referring now to FIG. 1, manipulator apparatus or robot 10 is illustrated adjacent a work station 12 to accomplish the welding of a workpiece generally referred to at 14 in accordance with the principles of the present invention. The workpiece 14, for example, as illustrated in FIG. 1 includes two metal plates 16, 18 which are to be welded along the abutting seam formed therebetween. The manipulator 10 includes a manipulator arm 20 that is provided with a hand or tool receiving portion 22. A manipulator hand arrangement 24 is positioned on the receiving portion 22. In one arrangement of the present invention, the hand 24 carries a weld gun 26 and a camera or other suitable imaging device 28. An optical pattern projection unit 30 is arranged either on the hand 24 or at a suitable fixed reference position independent of the hand. The weld gun 26 is connected to welding equipment referred to generally at 32 that provides a welding wire feed system at 34 to the weld gun 26 along with other suitable electrical interconnections and a welding gas supply in accordance with conventional welding practices.

The camera 28 is controlled by and provides imaging signals to a camera controller arrangement 36 over signal and control lines 38. The camera controller arrangement 36 is connected to provide signals to an image processing unit 40. The camera 28, the optical projection unit 30, the camera controller 36 and the image processing unit 40 comprise a vision system substantially as shown and described in the aforementioned copending Masaki application Ser. Nos. 077,320, 066,323 and 106,039.

The image processing unit 40 is interconnected over data lines 42 to a data transformation system and system controller 44 of the present invention. The data transformation system and system controller 44 controls operation of the manipulator welding system and controls operation of the manipulator 10 by means of a servo control system referred to generally at 46. The data transformation system and system controller 44 supplies the appropriate control signals to the servo control system 46 as command signals to position the manipulator arm 20 in one or more controllable axes.

In accordance with important aspects of the present invention and in one specific embodiment in an initial teach mode an operator controls the manipulator arm 20 in the controllable axes to move the tip of the weld gun 26 over a desired welding path with respect to the taught workpiece 14. During the teach mode, appropriate welding path data is recorded in the system controller 44 representing taught points along the desired welding path. Further, during a predetermined portion of the teaching mode, the projection unit 30 is operatively positioned to project a light pattern on the workpiece 14. In response to the projected light pattern, the camera 28 along with the camera controller 36 and the image processing unit 40 provide a reference or template image for storage along with the taught path data. The projection unit 30 projects an optical slit pattern on the workpiece 14 and the vision system components including the camera 28, the camera controller 36 and the image processing unit 40 detect the optical pattern as transformed by the shape of the surface of the workpiece 14. The reference or template image is taken at one or more suitable locations along the taught welding path as dependent upon the geometry of the welding path.

During the teach mode, welding data is also recorded including desired weld speed and other appropriate parameters of the welding operation. In another specific embodiment, only the reference template image is taken with a reference work piece and the taught welding path is recorded during the first repeat pass of the first repeat workpiece as well be explained in detail hereinafter. The taught path for the first repeat work piece is then utilized for successive work pieces.

In accordance with important aspects of the present invention, as successive workpieces are presented to the manipulator 10 for welding, the manipulator 10 is controlled to perform a repeat mode including a first repeat pass during which the manipulator arm 20 is controlled to move over the taught welding path at a speed much higher than weld speed in accordance with the stored taught data with the camera 28 operatively positioned over the taught welding path.

During the movement of the manipulator arm 20 in the first repeat pass over the taught welding path, the image processing unit 40 over data lines 42 provides deviation data from the detected workpiece images at suitable points along the welding path representing the deviation of the actual welding seam presented by the workpiece 14 from the taught welding path template image. In one specific embodiment, the system controller 44 in accordance with the stored taught data and the deviation data from the image processing unit 40 calculates and stores corrected welding path data for the present workpiece 14 accounting for any changes in location of the workpiece 14 from that of the taught reference workpiece in the teach phase.

In a second repeat pass of the repeat mode, the weld gun 26 is operatively positioned over the workpiece 14 and the corrected path data calculated and stored in the first repeat pass is utilized to control the manipulator arm 20 to weld the desired welding path on the workpiece 14 in cooperation with the operation of the welding equipment 32.

Thus, the desired welding path is taught and recorded on a reference workpiece 14 during a single teach mode and as successive workpieces 14 are presented to the manipulator 10, the repeat mode with the two repeat passes is performed for each of the workpieces.

Figure 2:
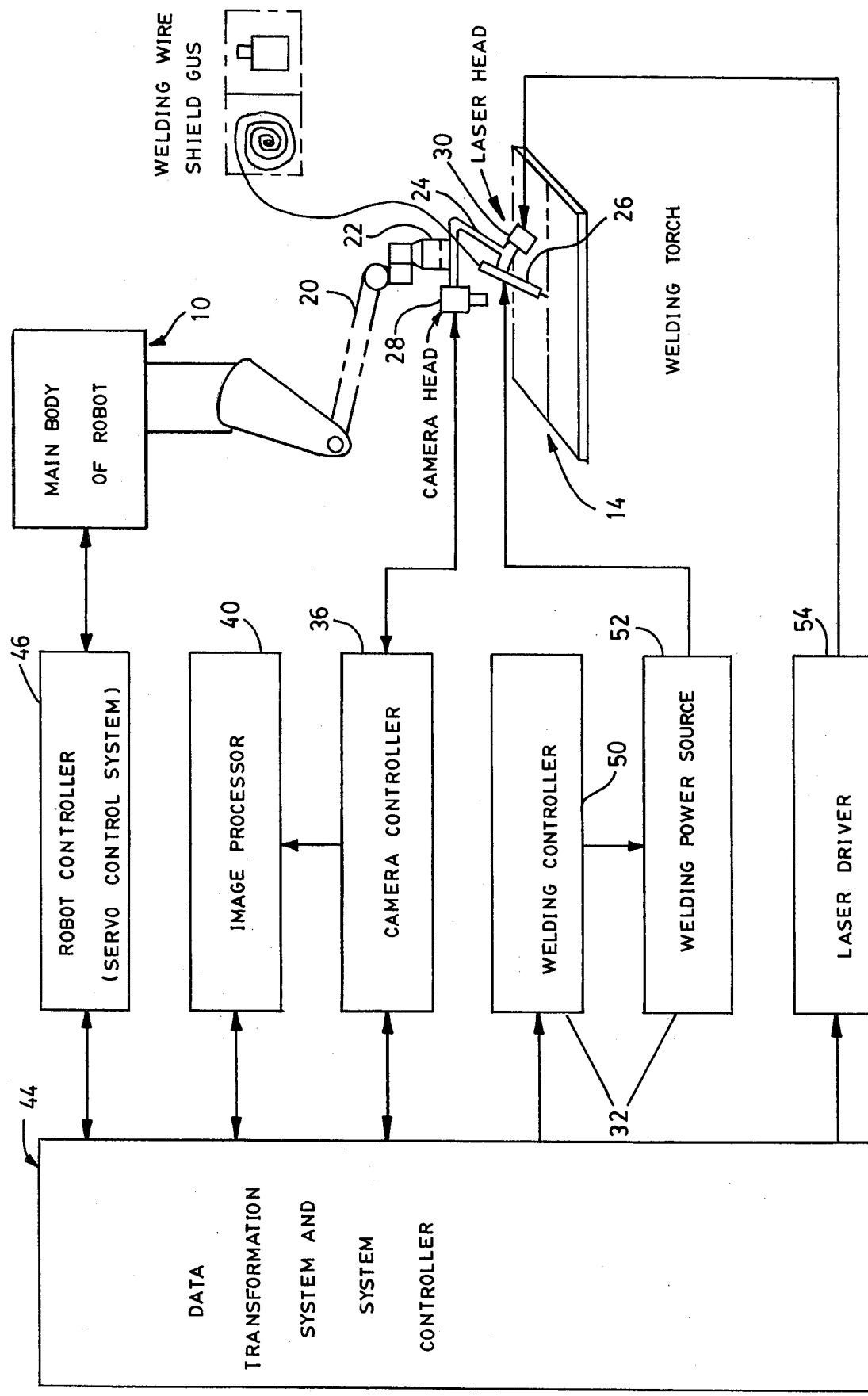
FIG. 2 is a perspective view of another form of a programmable manipulator adjacent a workpiece welding station and a block diagram representation of the control apparatus of the present invention of FIG. 1.

Referring now to FIG. 2, another type of manipulator 10 is illustrated for operation on a workpiece 14. The system controller 44 of the present invention is shown with appropriate data and control interconnections with the servo control system of the robot controller 46, the image processor 40, the camera 36, the welding equipment 32 including a welding controller 50 and a welding power source 52, and a laser driver stage 54 for operation of the projection unit 30 as a laser head.

The manipulator 10 suitable for use in practice of the present invention includes various types of programmable manipulators or robots. For example, a manipulator 10 as shown in FIG. 1 is commercially available from Unimation, Inc. as a UNIMATE (Trademark of Unimation, Inc.) type 2000 manipulator and the manipulator 10 of FIG. 2 is commerically available from Unimation, Inc. as a PUMA (Trademark of Unimation, Inc.) type 500 arm. The PUMA type 500 manipulator arm shown in FIG. 2 includes a microprocessor based control system operating in accordance with VAL (Trademark of Unimation, Inc.) programming and control system for computer controlled robots and manipulators. Reference may be made to the publication "User's Guide To VAL, A Robot Programming And Control System" version 11, February, 1979, 2nd Edition for a more detailed discussion of the operation of this type of manipulator.

The system controller 44 of FIGS. 1 and 2 in one arrangement of the present invention is operable as a VAL robot programming and control system as additionally enhanced by the data transformation system of the system controller 44 as will be explained in more detail hereinafter.

The system controller 44 for the manipulator 10 of FIG. 1 in other arrangements utilizes the respective control system as further described in U.S. Pat. Nos. 3,661,051, 4,086,522, 4,163,183 and copending application Ser. No. 154,439 filed by W. Perzley et al. on May 29, 1980 to which reference may be made for a more detailed discussion of suitable types of control systems for use in connection with the present invention.

Further, the operation of the vision system of FIGS. 1 and 2 including the camera 28, the projection unit 30, the camera controller 36 and the image processing unit 40 for providing a deviation output signal by comparison of a reference template image and an actual image is disclosed in the aforementioned copending Masaki application Ser. Nos. 077,320, 066,323 and 106,039 to which reference may be made for a more detailed discussion of the structure and operation of the vision system of FIGS. 1 and 2.

Figure 3:
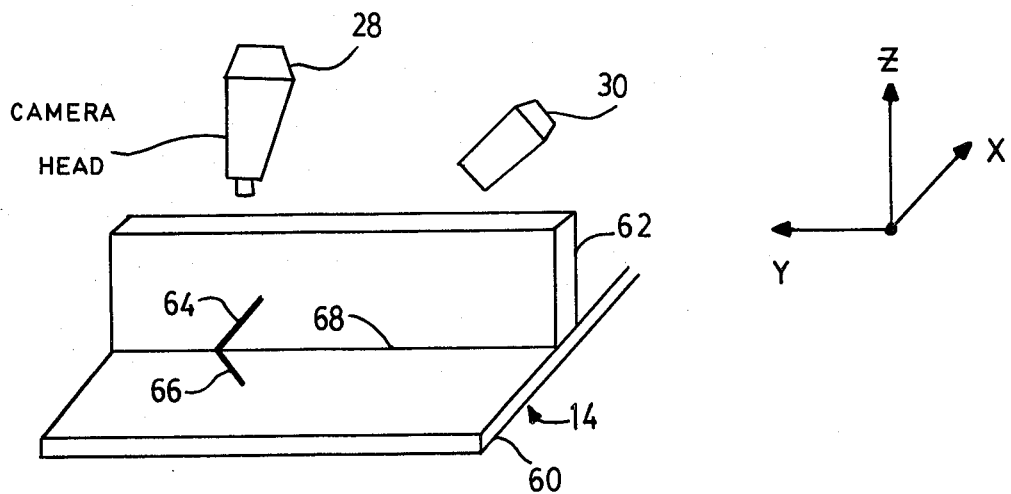
FIGS. 3 and 4 are perspective views representative of respective workpieces to be welded in accordance with the control apparatus of FIGS. 1 and 2 and illustrating projected light patterns of the vision system of the present invention.

Considering now a brief discussion of typical workpieces 14 to illustrate the operation of the present invention and referring now to FIG. 3, the projection unit 30 projects an optical slit pattern onto the generally perpendicularly arranged workpiece portions 60, 62. The workpiece portions 60, 62 transform the optical pattern projected by the unit 30 in accordance with the surface shape and position of the workpiece portions; for example, as depicted by line pattern 64 on workpiece portion 62 and line pattern 66 on workpiece portion 60. This type of optical pattern projection is useful for path correction systems including arc welding, sealing, brazing and the like.

Thus, the camera 28 detects the transformed light pattern image including image pattern portions 64 and 66; the intersection of the lines 64, 66 defining the points along the intersection seam 68 of the workpiece portions 60, 62 to be welded for various positions of the camera 28 and the projection unit 30.

Thus, considering both the reference workpiece in the teach mode and the successive workpieces encountered during the various repeat modes thereafter, the camera 28 detects the image portions 64, 66 of the actual welding seam 68 in accordance with the position of the workpiece portions 60, 62.

Figure 4:
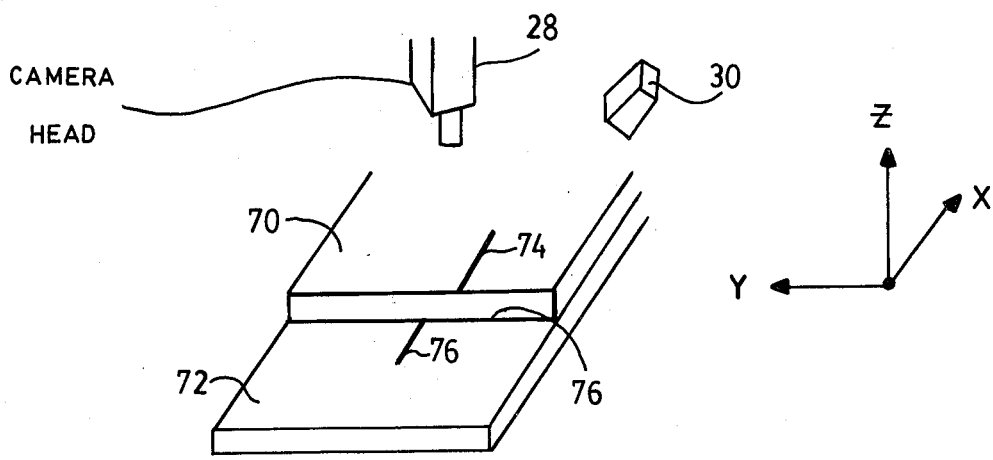

Referring additionally to FIG. 4, a second example of a welding application is illustrated therein for welding the lap seam between the generally planar and overlapping workpiece portions 70, 72. The optical projected slit pattern from the projection unit 30 forms an image as transformed by the shape of the workpiece portions 70, 72 including a first line image 74 on the workpiece portion 70 and a second line portion 76 on the workpiece portion 72.

Thus the respective workpiece images of FIGS. 3 and 4 are typical of the reference template image recorded by the image processor 40 in the teach mode for a reference workpiece and are also typical of the actual images formed by the successive workpieces in the repeat modes as detected by the camera 28 during the first pass of the repeat mode in accordance with operation on each successive workpiece.

Considering the taught welding path obtained in the teach mode and the corrected welding path obtained in the first repeat mode and referring to FIG. 5, an illustrative example of a taught path 68 includes the taught points A, B, C and D for example defining the straight line welding seam 68 to be welded on the workpiece portion 60, 62 of FIG. 3. Thus during the teach mode, data representing the taught points A, B, C and D are recorded and stored in the system controller 44 in accordance with movement of the weld gun 26 over the taught path 68. Additionally, the reference image or template 64, 66 detected by the camera 28 is also stored in the image processor 40.

In one specific arrangement of the present invention, the reference image 64, 66 is recorded at only one point along the teach path 68 since the geometry of the weld seam 68 results in a constant image being obtained at the various points along the desired welding path.

In the first repeat pass of the repeat mode for a workpiece 14 presented to the manipulator 10 and with the camera 28 in the operative position, the manipulator 10 is controlled to move in accordance with the taught path data at a relatively high rate of speed with the camera 28 obtaining slit pattern images resulting from the projected pattern from unit 30 on the workpiece 14 at the various taught points A, B, C and D in one specific arrangement. Thus at the taught points A, B, C and D, the image processing unit 40 calculates and provides respective deviation data $D_a$, $D_b$, $D_c$ and $D_d$ representing two-dimensional deviation data in an X-Z reference plane and including $\Delta X$ and $\Delta Z$ components. In one specific arrangement, the system controller 44 during the first repeat pass and in accordance with the deviation data $D_a$, $D_b$, $D_c$ and $D_d$ and the taught data representing the points A, B, C and D, calculates a corrected welding path represented by the corrected data points, A', B', C', and D' defining the actual welding seam presented by the newly positioned workpiece 14 representing positional changes from the taught reference workpiece position in the X and Z reference axes. In another specific arrangement, the system controller 44 utilizes absolute position data provided by digital encoders of the manipulator apparatus 10 and the deviation data $D_a$, $D_b$, $D_c$ and $D_d$ to provide the corrected data points A', B', C', and D'.

Figure 5A:
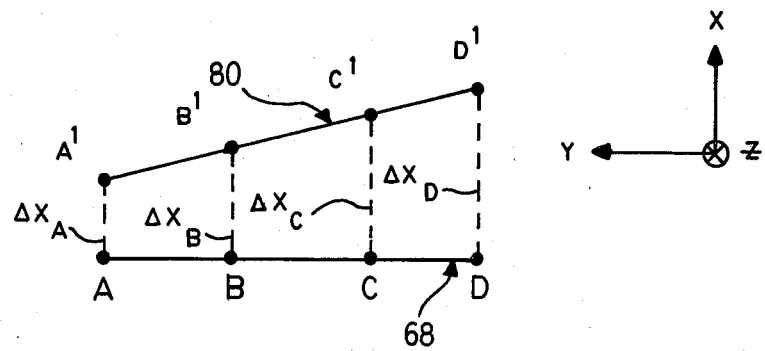
FIG. 5A is a graphical plan view representation.
Figure 5B:
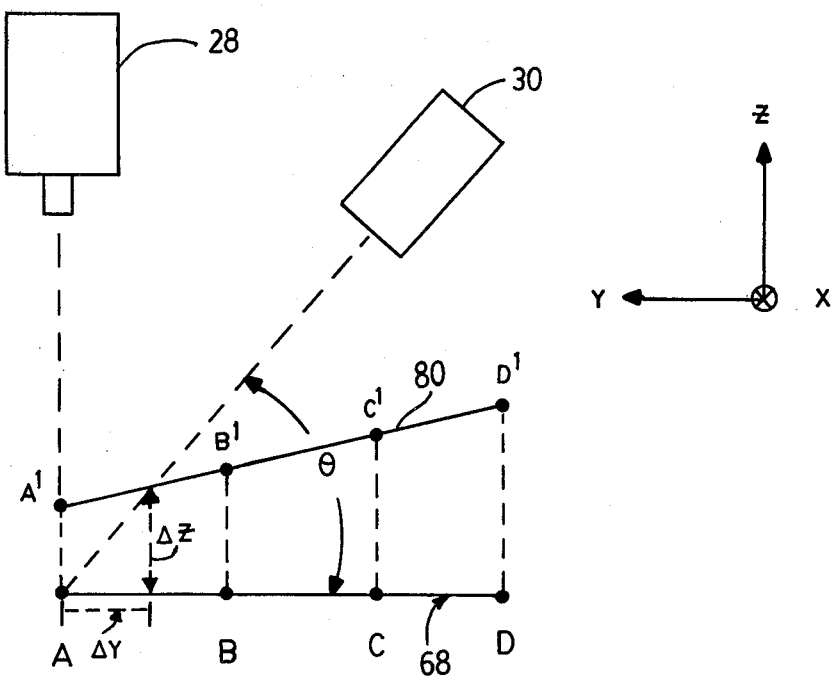
FIG. 5B is a front elevational view of a taught weld path on a workpiece and a corrected weld path in accordance with the principles of the present invention.

Refering now specifically to FIG. 5A, the plan view of the taught path 68 and the corrected path 80 represents for example the plan view of the workpiece weld path of FIG. 3. In FIG. 5A, the $\Delta X$ components of the deviation D in depicted. In FIG. 5B, the $\Delta Y$ deviation component illustrates the deviation in the Y-Z reference plane an detected by the image processing unit 40. The $\Delta Z$ deviation components are calculated by the image processing unit 40 in accordance with the relationships $\Delta Z = \Delta Y \tan \theta$, where $\theta$ is the depicted angle in FIG. 5B formed between the X-Y reference plane and the projection unit 30.

In the specific arrangement where the present position of the manipulator is utilized in conjunction with the deviation data at the respective point to provide the corrected path data 80, inaccuracies due to servo loop positioning in response to the taught data do not affect the actual corrected data for the welding path. Further such an arrangement is suitable wherein in the first repeat pass it is desirable to take the images at points other than the taught points for various reasons. Thus the present position of the manipulator is utilized in accordance with the deviation data at the respective present positions to obtain the corrected welding path data.

Figure 6:
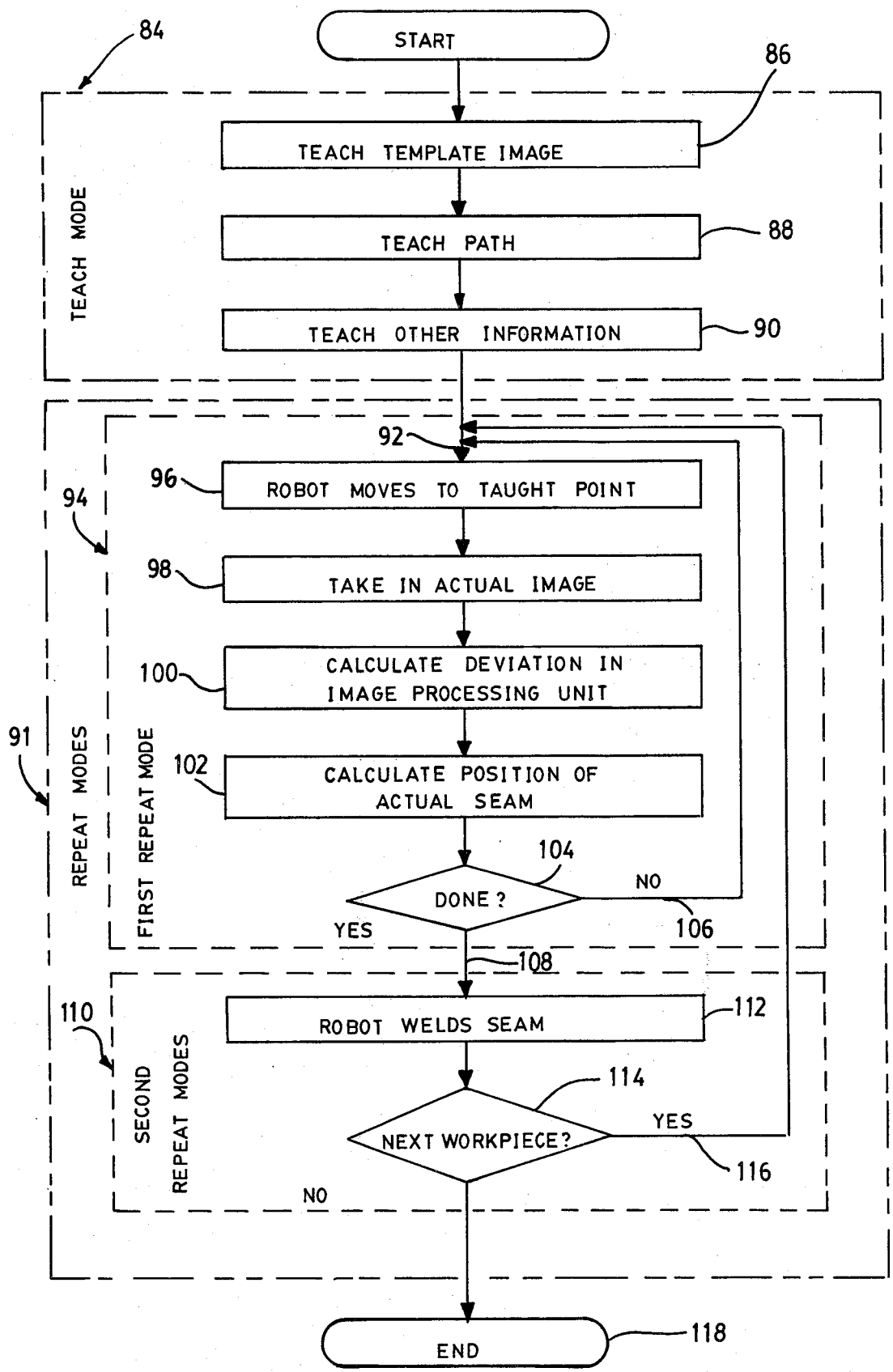
FIG. 6 is a flow diagram illustrating the method of the present invention and the general operation of the control apparatus of the present invention of FIGS. 1 through 5 to accomplish welding of a workpiece.

Considering now the basic operation of the system controller 44 and in particular the data transformation system provided therein and referring now to FIG. 6, the flow diagram of FIG. 6 represents the operation of the present invention including the additional functions performed by the system controller 44 in addition to available manipulator control arrangements such as the PUMA type 500 arm with VAL control programming discussed hereinbefore. The start of the flow program of the system controller 44 proceeds through the teach mode 84 wherein the function block 86 represents the teaching of the reference template image in accordance with the data from a vision system with the camera 28 in the operative position and the projection unit 30 projecting the slit pattern resulting in image 64, 66 of FIG. 3 onto the taught reference workpiece.

After teaching the template image the program flow proceeds to a function block 88 representing the teaching of the desired welding path on the reference workpiece 14 for example by the movement of the manipulator along the welding path 68 of FIG. 3 and the storing of data representing the taught points A, B, C and D of FIG. 5. The program flow proceeds to a function block 90 wherein other appropriate teaching information is recorded such as the desired welding speed and other parameters of the welding operation. The teach step 90 also includes appropriate weld gun and camera position definition data as may be necessary due to offsets of the weld gun point and optical center point of the manipulator hand from a reference point. In accordance with VAL programming, the teach step 90 includes the inputting of data representing and defining either the offsets of the hand 24 in the camera and weld gun positions or two separately attached hands in a specific arrangement wherein a camera hand and a separate weld gun hand are provided.

The program flow of the system controller 44 then proceeds to the repeat modes 91 and specifically at flow point 92 into the first repeat mode or pass 94. In the first repeat mode 94, a function block 96 represents operation of the servo controller 46 moving the manipulator 10 at a high rate of speed to the first taught point. After the manipulator has been moved to the first taught point with the camera 28 in the operative position over the workpiece 14, an actual image at taught point A is obtained from the vision system. The flow of the program proceeds to a function block 100 wherein the image processing unit 40 calculates the deviation $D_a$ and provides this deviation to the system controller 44.

After the image processing unit has provided the deviation data $D_a$ representing the deviation between the taught point A and the actual weld seam point represented by the workpiece, the program flow proceeds to a function block 102 wherein the system controller 44 calculates the position of the actaul seam as data point A' from the deviation data $D_a$ and the taught data point A. When the calculation of the actual point A' is completed, the program flow proceeds to the decision block 104 to determine whether or not the first repeat pass has been completed encompassing the calculation of corrected path data for each of the taught data points, for example A, B, C and D. In the present example, whereupon particular data point A' has just been calculated, the result in decision block 104 is NO and the program flow proceeds via signal line 106 back to program flow point 92 to the function block 96. In function block 96, the taught data is incremented by one data point and the first repeat pass flow 94 continues to calculate the corrected data B', C' and D' corresponding to the respective taught points B, C and D when the manipulator arm 20 is moved to each of the taught points B, C and D. It should be understood however that the flow diagram of FIG. 6 is merely illustrative of one specific embodiment of the present invention. For example in another specific embodiment the corrected data A', B', C' and D' are calculated after the arm has been moved to all the taught points A, B, C and D and the respective deviation data $D_a$, $D_b$, $D_c$ and $D_d$ are obtained.

When the last corrected path point such as D' has been calculated in accordance with the image taken from the taught point D, the result in decision block 104 is yes and the program flow proceeds through flow point 108 to the second repeat mode or second repeat pass 110 of the repeat mode 91. In the second repeat mode 110, a function block 112 proceeds to condition the manipulator 10 for welding the actual seam of the workpiece in accordance with the actual welding path 80 defined by the corrected data points A', B', C' and D' stored in the system controller 44 as a result of the first repeat mode 94. Now with the weld gun 26 in the operative position, the function block 112 proceeds to condition the manipulator 10 to weld the actual seam with appropriate control of the welding equipment 32 and the desired recorded speed of movement along the actual path 80 in accordance with the data entered in the teach mode. Thus, the manipulator arm 20 is controlled to move the weld gun 26 over the path defined by the points A', B', C' and D'.

After the completion of the weld path 80, the program flow proceeds to the decision block 114 to determine whether the next workpiece to be welded is in position. If the determination is YES signifying that another workpiece is to be welded and is in position for welding, the program flow proceeds from the decision block 114 over the signal path 116 to the flow point 92 at the beginning of the first repeat mode 94.

Thus for the next workpiece, the first and second repeat modes 94 and 110 respectively are accomplished with the next workpiece being sensed in the first repeat mode, the actual welding path being calculated, and the welding path being welded in the second repeat mode 110.

If the decision in the block 114 results in an indication that there is no additional workpiece to be welded, the program flow proceeds to an end of program function 118 with appropriate termination of the program. The next workpiece indication in the block 114 is provided in specific arrangements by either external operator input, or by control inputs of the system controller 44 via automated workpiece transfer apparatus, or by a sensing function performed by the manipulator 10.

Figure 7:
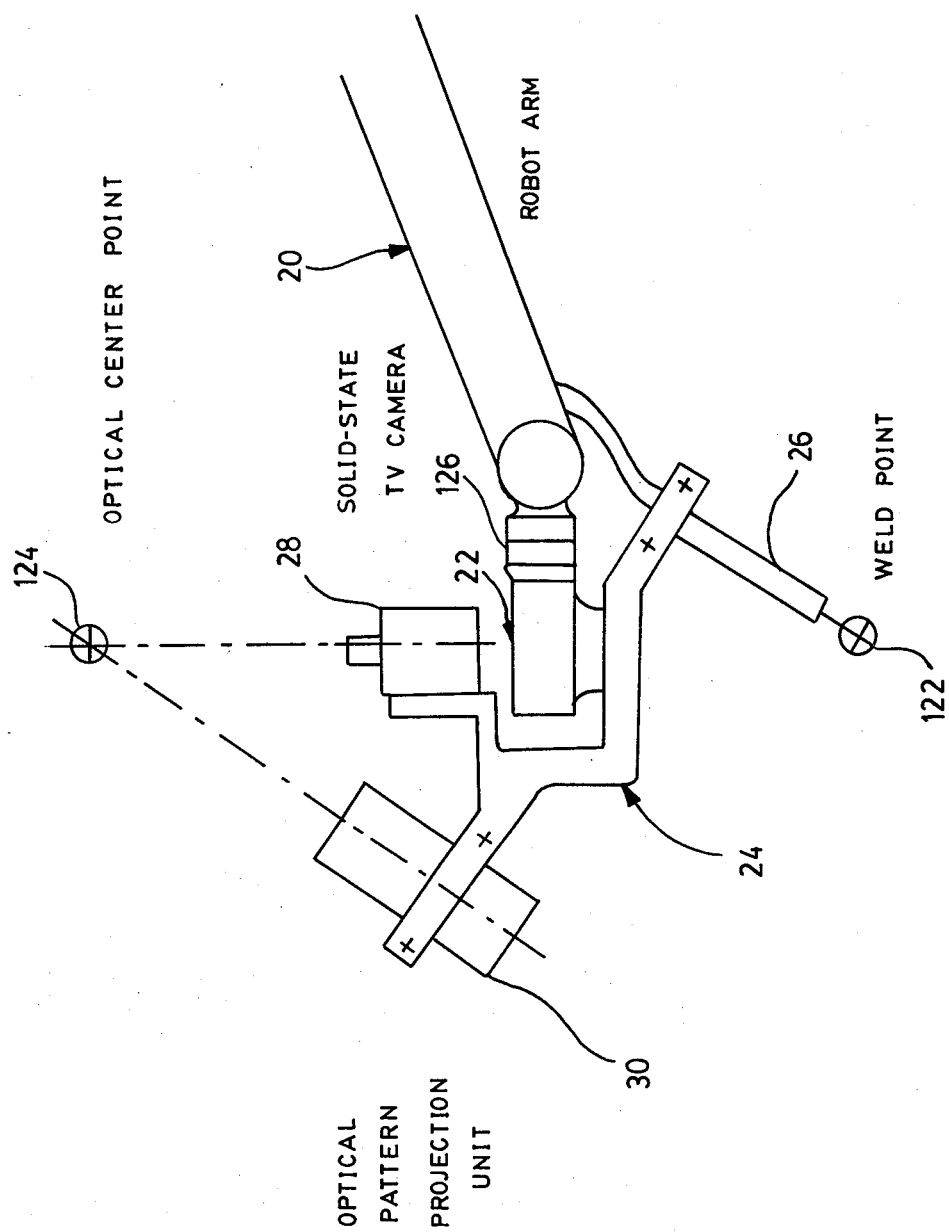
FIG. 7 is an enlarged, elevational view of the manipulator arm of the present invention of FIGS. 1 and 2 and illustrating one hand arrangement to practice the present invention including a visual detection system and a weld gun.

Considering now the details of the manipulator hand 24 that selectively positions either the weld gun 26 or the camera 28 and projection unit 30 of the vision system to the operative position over the welding path of the workpiece and referring now to FIG. 7, the weld gun 26 is positioned and carried on the manipulator hand 24 at a position approximately 180 degrees apart from the optical pattern projection unit 30 and the camera 28. Thus, the weld gun 26 defines a weld point 122 and the camera 28 and optical pattern projection unit 30 define an optical center reference point 124 at the intersection of their respective optical axes. The weld point 122 and the optical center point 124 are approximately 180 degrees apart on the hand 24. The manipulator arm 20 includes a controllable axis defining an articulated joint at 126 providing a yaw or wrist swivel movement to rotate the hand 24 to provide the presentation of either the weld gun 26 at weld point 122 or the vision system at optical center point 124 over the welding seam of the workpiece.

Thus with appropriate programming of the system controller 44 or by the input of a teach operator on the manipulator controls, the manipulator arm 20 selectively presents either the optical center point 124 or the weld point 122 to the workpiece. As discussed hereinbefore, the weld point 122 is presented during portions of the teach mode and during the second repeat pass. Further, the optical center point is positioned over the workpiece during a portion of the teach mode and also during the first repeat pass.

In the situation where the selective rotation of the hand 24 through wrist swivel movement at 126 results in different offsets between the optical center point 124 and the weld point 122 with respect to the receiving portion 22 of the manipulator arm, the system controller 44 includes appropriate hand definition data including the transformation of coordinates defining the various respective offset of the optical center point and the weld point to appropriately position either the optical center point or the weld point at the stored data points representing either taught data or corrected path data. Further, during the teach mode, the offset data of the weld point and the optical center point are utilized to allow accurate positioning of the camera 28 or the weld gun 26 and the appropriate recording of position data defining manipulator arm position in each of the controlled axes.

In another specific embodiment, the weld gun 26, and the camera 28 are mounted on the hand 24 such that both the camera axis and the weld point 122 are simultaneously aligned with and presented to the workpiece. Further, the projection unit 30 is also mounted on the hand 24 with the optical center point 124 being aligned with the work piece simultaneously with the weld point 122.

Figure 8:
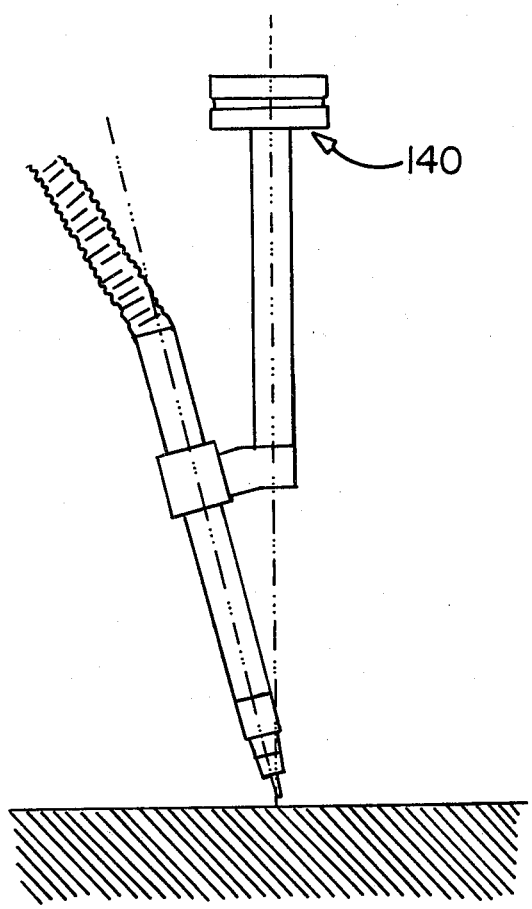
FIG. 8 is an elevational view of a weld gun hand.
Figure 9:
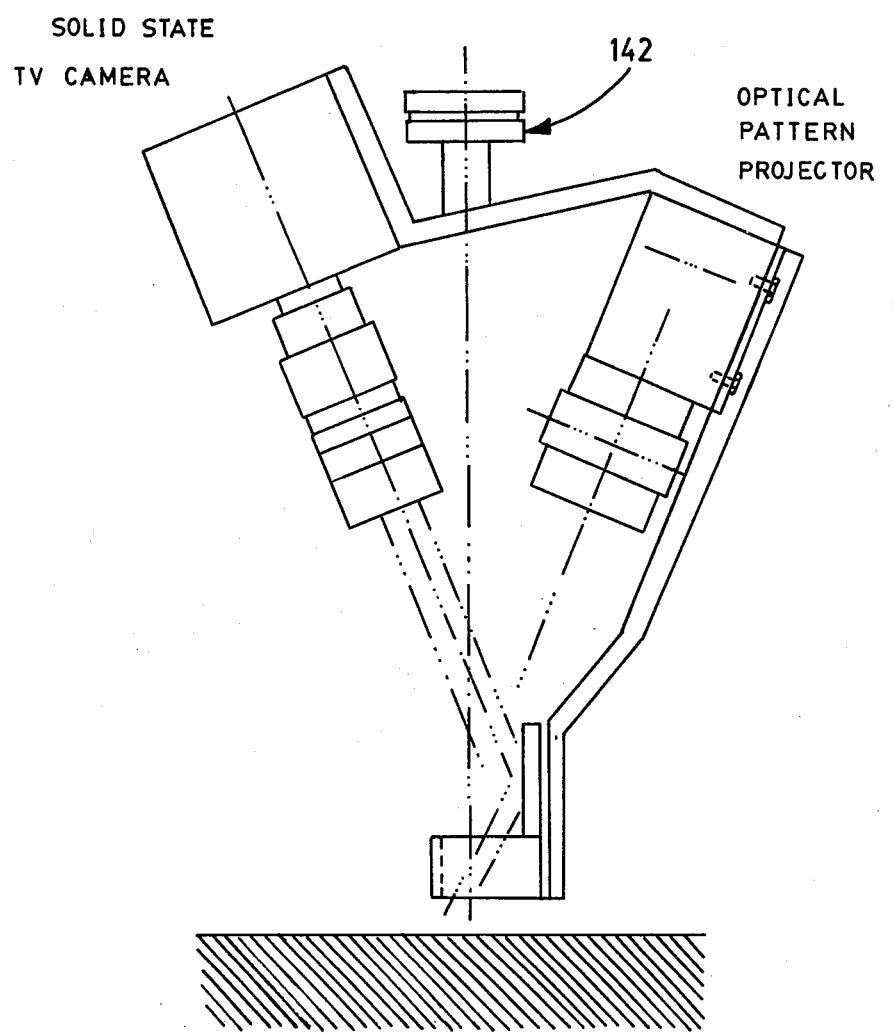
FIG. 9 is an elevational view of a vision system hand that provides minimal interference to the work piece environment.
Figure 10:
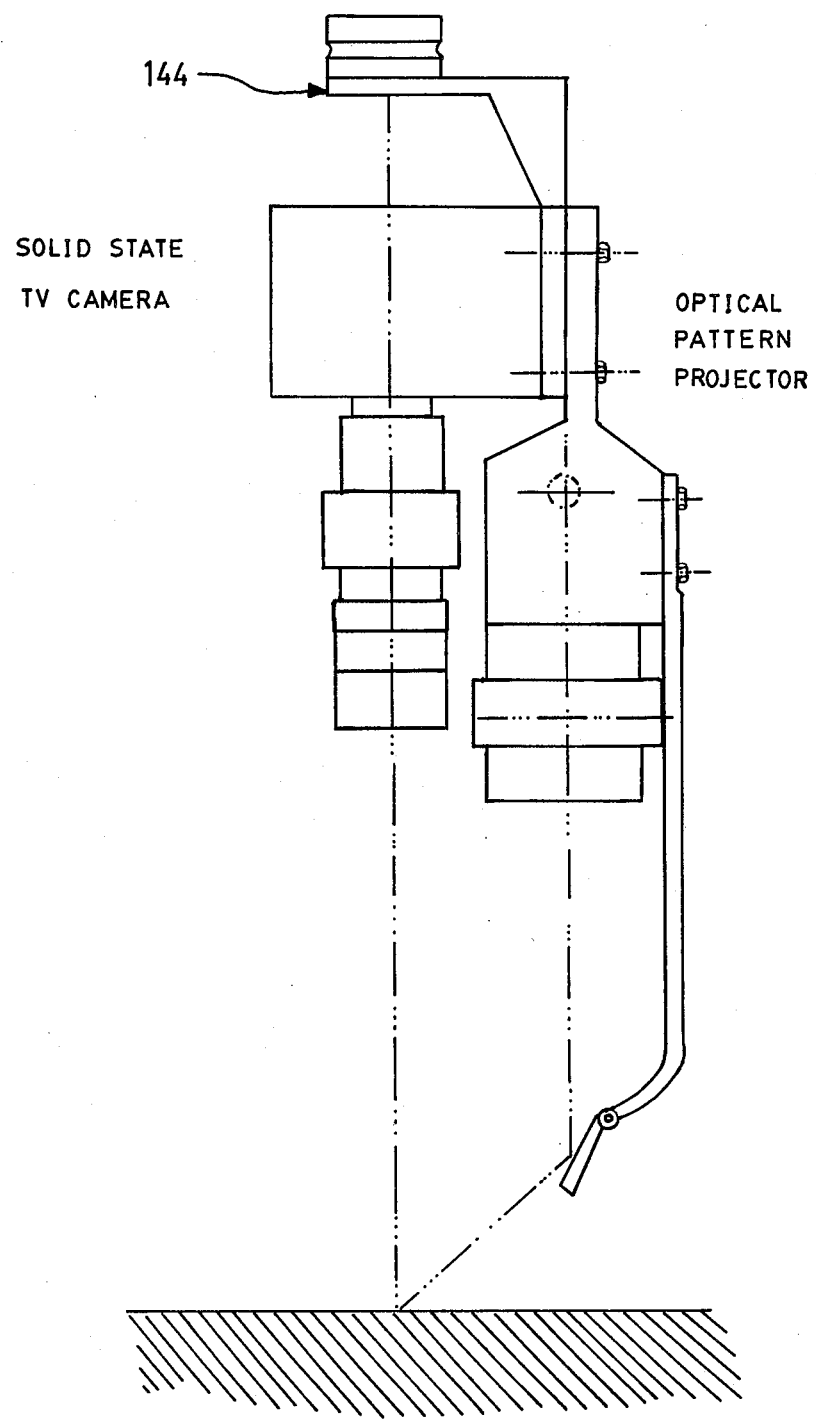
FIG. 10 is an elevational view of an alternate vision system hand.

Considering now FIGS. 8, 9 and 10 and the specific arrangement where a separate weld gun hand 140 (FIG. 8) and a separate camera and projection unit hand 142 (FIG. 9) or 144 (FIG. 10) are provided, the manipulator automatically and selectively attaches one of the hands as required for the particular programmed operation as explained in connection with FIG. 6. The exchange between the hands is also automatically provided by the manipulator 10 in accordance with the programmed operation of the system controller 44. The hand not currently being used by the manipulator 10 is placed in a hand holder (not shown). The manipulator 10 in accordance with programmed control automatically exchanges the hands from the respective hand holder stations as required by placing one hand in one hand holder station and picking up the second hand in a second hand holder station. Of course, the various transformation offsets between each of the hands and the manipulator arm hand reference point at the hand attachment are also stored by the system controller to enable proper positioning of each of the hands and the accurate recording of arm position data. It should be noted that the various embodiments of the hands 24, 140, 142 and 144 provide minimal intrusion problems to the work piece environment to avoid obstructions in the work piece environment.

Considering now the operation of the present invention concerning the data transformation system of the system controller 44, a generalized coordinate transformation analysis will be discussed first that applies to generalized manipulator operations.

The deviation data obtained from the image processing unit 40 in the first repeat mode is presented to the system controller 44 in coordinates relative to the orientation of the coordinate axes of the camera 28. The deviation data at a particular point i referred to hereinbefore as $D_i$, for example, is represented by X and Z components $\Delta X_i$ and $\Delta Z_i$, respectively denoting horizontal and vertical deviation as referenced in FIG. 5. The deviation in a matrix format is defined as follows:

$$[D] = \begin{bmatrix} 1 & 0 & 0 & \Delta X_i \\ 0 & 1 & 0 & 0 \\ 0 & 0 & 1 & \Delta Z_i \\ 0 & 0 & 0 & 1 \end{bmatrix}$$

Appropriate reading of the deviation components is provided by the system controller 44.

A transformation matrix $[C_w]$ from camera coordinates to a world generalized coordinate reference of the manipulator is obtained as follows:

$$[C_w] = [R_w] \times [C_R],$$

where $[R_w]$ represents the transformation matrix from wrist reference coordinates of the manipulator to generalized world coordinates, and $[C_R]$ represents the transformation matrix from camera reference coordinates to wrist coordinates.

Thus, a target or destination point $[P_w]$ in the repeat mode for welding includes the corrected coordinates for the weld gun in generalized world coordinates and is defined as follows:

$$[P_w] = [C_w] \times [D].$$

To properly control the position of the manipulator arm, it is necessary to define $[R'_w]$ the coordinate matrix that describes the corrected position and orientation for the manipulator wrist in generalized world coordinates. The matrix $[R'_w]$ is obtained as follows:

$$[R'_w] = [P_w] \times [T_r]^{-1},$$

where the matrix $[T_r]^{-1}$ represents the transformation matrix from the weld gun coordinates at the weld point 122 to the wrist reference coordinates.

Thus, the matrix $[R'_w]$ is used to control operation and positioning of the manipulator 10 in the second repeat mode in accordance with the following relationship:

$$[R'_w] = [C_w] \times [D] \times [T_r]^{-1}.$$

Considering now a more detailed and specific application of the present invention utilizing a PUMA type 500 manipulator having a VAL programming and control system, the taught point data is utilized directly to obtain the corrected weld path coordinates in accordance with the deviation data obtained in the first repeat pass.

Specifically, the deviation obtained at a particular taught point i is represented as $[DEV]_i$ and represents the deviation defining the corrected weld point relative to the camera coordinates in the first repeat pass. The corrected weld point $[REPEAT]_i$ is obtained as follows:

$$[REPEAT]_i = [TAUGHT]_i \times [DEV]_i$$

resulting in the matrix definition of the corrected point A' corresponding to the taught point A for example.

The specific variations and additions to the VAL program and control system to practice the present invention includes the definition of a MOVCAM A, A' function or instruction that defines the movement of the manipulator arm to location A, reading the camera deviation [DEV] at location A via the image processor, and defining the location of a corrected point A' therefrom.

Considering the specific program steps to be accomplished to practice the present invention, the following program steps are performed as organized into PROGRAM TEACH and PROGRAM REPEAT segments as follows and corresponding to the flow diagram of FIG. 6 (illustrating a taught path of 4 points):

PROGRAM TEACH

1. TOOL WELD
2. SPEED WELD
3. WELD ON
4. MOVE A
5. MOVE B
6. MOVE C
7. MOVE D
8. WELD OFF

PROGRAM REPEAT

REPEAT PASS ONE

1. TOOL CAMERA
2. SPEED REPEAT
3. MOVCAM A, A'
4. MOVCAM B, B'
5. MOVCAM C, C'

6. MOVCAM D, D'

REPEAT PASS TWO

7. TOOL WELD
8. SPEED WELD
9. WELD ON
10. MOVE A'
11. MOVE B'
12. MOVE C'
13. MOVE D'
14. WELD OFF

Additionally, during the PROGRAM TEACH phase, an operator teaches a reference image template as described hereinbefore. Further, the two tools CAMERA and WELD GUN are defined corresponding to the respective TOOL CAMERA and TOOL WELD steps with the VAL program and control system incorporating the TOOL [<transformation>] program instruction setting the value of tool transformation to the value defined in the brackets <transformation>. The effect of the TOOL command results in the monitoring by the VAL system to account for the transformation offset matrix of the defined tool; i.e., an internal matrix representing the tool offset coordinates is automatically taken into consideration each time data is to be recorded or each time the manipulator is moved to a defined point.

The SPEED WELD of step 2 in PROGRAM TEACH enters the desired welding speed, for example 5 units/second. The SPEED REPEAT of step 2 of REPEAT PASS ONE enters the desired repeat speed, for example, 200 units/second.

Concerning the preferred embodiment of the present invention, the PROGRAM TEACH sequence is not performed and only the PROGRAM REPEAT sequence of steps 1-14 is necessary along with the teaching of a reference image template. Then, in the preferred embodiment and during the repeat operation on the first repeat workpiece, the MOVCAM steps include movement by the operator and the teach controls to the designated points A, B, C and D in addition to the generation of the deviation via the image processor and the defining of the corrected data points A', B', C' and D'. For succeeding repeat work pieces, the program steps 1-14 of the PROGRAM REPEAT sequence are performed and the operation is as described hereinbefore with the MOVCAM steps operating in accordance with the data A, B, C, and D entered for the first repeat work piece.

While there has been illustrated and described several embodiments of the present invention, it will be apparent that various changes and modifications thereof will occur to those skilled in the art. For example, various types of vision systems are utilized in various specific embodiments utilizing various forms of electromagnetic ware generation by the projection unit and complementary sensing-detection devices. It is intended in the appended claims to cover all such changes and modifications as fall within the true spirit and scope of the present invention.

What is claimed as new and desired to be secured by Letters Patent of the United States is:

1. Control apparatus for manipulator welding apparatus, the manipulator apparatus having a manipulator arm controllable in one or more axes and arranged to perform a weld path on a workpiece at a workpiece station, the control apparatus comprising:

means for storing manipulator arm position data during an initial teach phase representing a desired taught weld path with respect to a reference workpiece at a predetermined location at the workpiece station;

means for projecting a predetermined light pattern on the workpiece at said workpiece station;

means for storing a reference image of said projected predetermined light pattern during said teach phase;

means for moving said manipulator arm along said taught weld path in accordance with said stored manipulator arm position data during a first repeat phase with respect to a second subsequent workpiece;

means for sensing said predetermined projected light pattern on said second subsequent workpiece as said manipulator arm moves along said taught weld path during said first repeat phase;

image processing means responsive to said sensing means for generating deviation data representing the deviation between the actual weld path of said second workpiece and said path described by said manipulator arm during said first repeat phase;

means responsive to said generated deviation data for generating corrected weld path data representing said actual weld path on said second workpiece; and means responsive to said corrected weld path data for moving said manipulator arm and controlling said manipulator welding apparatus to weld said second workpiece along said actual weld path during a second repeat phase.

2. The control apparatus of claim 1 wherein said manipulator arm position data stored during said initial teach phase represents a plurality of points along said taught weld path.

3. The control apparatus of claim 2 wherein said sensing means is operative to sense an image of said predetermined light pattern at each of said plurality of taught points.

4. The control apparatus of claim 3 wherein said corrected weld path generating means in responsive to the actual position of said manipulator arm at each of said sensed image points.

5. The control apparatus of claim 3 wherein said corrected weld path generating means is responsive to said taught point data.

6. The control apparatus of claim 1 wherein said workpiece includes two or more general planar portions arranged in a predetermined workpiece configuration and defining said predetermined actual weld path.

7. The control apparatus of claim 6 wherein said projecting means projects a slit pattern image onto said workpiece.

8. The control apparatus of claim 7 wherein said projected slit pattern image when projected onto said workpiece across said actual weld path is transformed in accordance with the surface shape and position of said workpiece.

9. The control apparatus of claim 8 wherein said workpiece portions are arranged in an overlapping configuration.

10. The control apparatus of claim 8 wherein said workpiece portions are arranged so that said workpiece portions form one or more predetermined angles with respect to each other.

11. The control apparatus of claim 8 wherein said workpiece portions are arranged to present an actual weld path defined by the respective abutting edges of said workpiece portions.

12. The control apparatus of claim 1 further comprising program control means for storing weld condition parameters including weld speed.

13. The control apparatus of claim 1 wherein wherein said second repeat phase moving and welding means further comprises image processing means for generating deviation data representing the deviation between said desired weld path of the subsequent workpiece and said predetermined path of said first repeat phase.

14. A manipulator hand for a programmable manipulator having a manipulator arm movable in a plurality of controllable axes, the manipulator hand being carried at the end of said manipulator arm, said manipulator hand comprising means for carrying a weld gun, means for carrying a visual detection system, and means for selectively rotating either said weld gun or said visual detection system so as to be positioned in an operative orientation with respect to a reference point on said manipulator arm.

15. Control apparatus for manipulator welding apparatus, the manipulator apparatus having a manipulator arm controllable in one or more axes and arranged to perform a weld path on a workpiece, the control apparatus comprising:
 means for storing a predetermined projected image pattern of a first workpiece at a predetermined location;
 means for moving said manipulator arm along a weld path on a second subsequent workpiece, defining a taught weld path;
 means for sensing said predetermined projected image pattern along said taught weld path and defining the actual weld path of said second workpiece;
 image processing means responsive to said sensing means for determining the deviation between said actual weld path and said taught weld path;
 means responsive to said image processing means for calculating corrected weld path data representing said actual weld path on said second workpiece; and
 means responsive to said corrected weld path data for welding said second workpiece along said actual weld path.

16. A method for operating manipulator welding apparatus having a manipulator arm controllable in one or more axes and arranged to perform a welding path with respect to a workpiece located at a workpiece station, the method comprising the steps of:
 projecting a predetermined light pattern on said workpiece station;
 storing a reference template image of said projected light pattern on a reference workpiece at a predetermined location at said workpiece station;
 teaching a desired weld path representing manipulator arm position along said desired weld path on a workpiece;
 sensing said projected light pattern on a workpiece as said manipulator arm is moved over said taught weld path, said projected light pattern on said workpiece defining the actual weld path on said workpiece;
 calculating the deviation between said actual weld path and the path described by said manipulator arm during said sensing step in response to said sensing step;
 calculating corrected weld path data representing said actual weld path of said workpiece in accordance with said calculated deviation; and
 welding said actual weld path on said workpiece by controlling movement of said manipulator arm in accordance with said corrected weld path data.

17. The method of claim 16 wherein said sensing step, said deviation calculating step, said corrected weld path step, and said welding step are repeated for each successive workpiece presented to the manipulator work station.

18. The control apparatus of claim 16 wherein said second repeat phase moving and welding means further comprises means responsive to said deviation data and the position of said manipulator arm during the movement along said predetermined path during said first repeat phase for providing desired weld path data representing said desired weld path along the subsequent workpiece.

19. A method for operating manipulator apparatus having a manipulator arm controllable in one or more axes and arranged to perform a welding path with respect to a workpiece located at a workpiece station, the method comprising the steps of:
 projecting a predetermined light pattern on the workpiece station;
 storing a reference image resulting from said projected light pattern on a reference workpiece at a predetermined location at the workpiece station;
 sensing the light pattern on a subsequent workpiece at the workpiece station resulting from said projected predetermined light pattern as said manipulator arm is moved over a predetermined path;
 calculating desired weld path data representing the desired weld path of the subsequent workpiece in accordance with said stored reference image and said sensed light pattern of said sensing step; and
 welding the desired weld path on the subsequent work piece by controlling movement of said manipulator arm in accordance with said desired weld path data of said calculating step.

20. Control apparatus for manipulator welding apparatus having a manipulator arm controllable in one or more axes and arranged to perform a weld path on a workpiece at a workpiece station, the control apparatus comprising:
 means for projecting a predetermined light pattern on the workpiece at the workpiece station;
 means for storing reference image data representing the light pattern on a reference workpiece resulting from said projected predetermined light pattern;
 means for moving said manipulator arm during a first repeat phase along a predetermined path with respect to a subsequent workpiece and for sensing the light pattern on the subsequent workpiece resulting from said predetermined projected light pattern; and
 means jointly responsive to said sensing means and said reference image data for moving said manipulator arm and for controlling said manipulator welding apparatus to weld the subsequent workpiece along a desired weld path during a second repeat phase.

21. The control apparatus of claim 20 further comprising program control means for repeating said first and second repeat phases from each successive workpiece presented at the work station.

22. The control apparatus of claim 21 wherein said stored reference image is acquired by said sensing means at one or more predetermined points along said taught weld path.

23. The control apparatus of claim 20 wherein said projecting means is arranged to project said predetermined light pattern at a predetermined angle with respect to the reference plane of said work station.

24. The control apparatus of claim 20 wherein said first repeat phase moving and sensing means comprises image detection means carried by said manipulator arm.

25. The control apparatus of claim 24 wherein said manipulator arm comprises a manipulator hand carried at one end of said manipulator arm, said manipulator hand comprising a weld gun and carrying said image detection means.

26. The control apparatus of claim 25 wherein said manipulator hand comprises means for selectively and alternately presenting either said image detection means or said weld gun to said workpiece.

27. The control apparatus of claim 24 wherein said weld gun defines a weld point, and said image detection means in combination with said projection means defines an optical center point at the intersection of the respective optical axes of said projection means and said image detection means.

28. The control apparatus of claim 27 wherein said manipulator hand comprises means for moving said weld gun and said image detection means with said weld point and said optical center point being coincident.

29. The control apparatus of claim 24 wherein said manipulator hand carries said projecting means.

30. The control apparatus of claim 20 wherein said manipulator arm comprises manipulator hand receiving means, said control apparatus further comprising first manipulator hand means adapted to interfit with said hand receiving means and carrying a weld gun and second manipulator hand means adapted to interfit with said hand receiving means, said sensing means comprising image detection means carried by said first repeat phase moving and second manipulator hand means.

31. The control apparatus of claim 30 wherein said second hand means further carries said projecting means with the optical axes of said image detection means and said projecting means defining an optical center point.

32. The control apparatus of claim 31 wherein said projecting means is arranged with an optical axis forming a predetermined angle with respect to the reference plane of the workpiece.

33. The control apparatus of claim 20 further comprising program control means for operating said first repeat phase moving and sensing means in said first repeat phase at a speed that is at least an order of magnitude higher than said speed of said manipulator arm during said second repeat welding movement.

34. The control apparatus of claim 20 further comprising means for storing manipulator arm position data during an initial teach phase representing a desired taught weld path with respect to a reference workpiece at a predetermined location at the workpiece station.

35. The control apparatus of claim 34 wherein said first repeat phase moving and sensing means is responsive to said stored manipulator arm position data.

36. The control apparatus of claim 35 wherein said second repeat phase moving and welding means is responsive to said stored manipulator arm position data and wherein said first repeat phase moving and sensing means is operative to sense the resulting light pattern at each stored manipulator arm position.

37. The control apparatus of claim 34 wherein said reference image storing means is operative to store reference image data at one or more predetermined points along said taught weld path.

38. The method of claim 19 wherein said sensing step, said calculating step, and said welding step are repeated for each successive workpiece presented to the manipulator work station.

39. The control apparatus of claim 20 wherein said first repeat phase moving and sensing means is operative to sense the light pattern resulting from said projected predetermined light pattern at a predetermined number of points along said predetermined path.

40. The control apparatus of claim 20 wherein said second repeat phase moving and welding means is responsive to the position of said manipulator arm at each point at which the light pattern is sensed.

41. The manipulator hand of claim 14 wherein said weld gun defines a weld point.

42. The manipulator hand of claim 41 wherein said visual detection system includes image detection means and projection means for projecting a predetermined light pattern on a workpiece.

43. The manipulator hand of claim 42 wherein said image detection means in combination with said projection means defines an optical center point at the intersection of the respective optical axes of said projection means and said image detection means.

44. The manipulator hand of claim 43 wherein said weld point and said optical center point are approximately 180° degrees apart with respect to said reference point on said manipulator arm.

45. The manipulator hand of claim 43 wherein said visual detection system carrying means and said weld gun carrying means comprises extending structures of said manipulator hand, said manipulator hand being rotatable with respect to said manipulator arm about a predetermined hand rotation axis.

46. The manipulator hand of claim 43 wherein said weld gun carrying means and said visual detection system carrying means are fixedly carried on a common portion of said manipulator hand, said selectively rotating means comprising means carried at the end of said manipulator arm for rotating said common portion of said manipulator hand about a predetermined hand rotation axis.

47. The manipulator hand of claim 14 further comprising a main body portion that is rotatable about a predetermined hand rotation axis, each of said visual detection carrying means and said weld gun carrying means comprising an arm extending from said main body portion.

* * * * *

UNITED STATES PATENT AND TRADEMARK OFFICE
CERTIFICATE OF CORRECTION

PATENT NO. : 4,380,696
DATED : April 19, 1983
INVENTOR(S) : Masaki

It is certified that error appears in the above–identified patent and that said Letters Patent are hereby corrected as shown below:

Column 14, line 50, "1" should read --20--;
Column 15, line 5, "1" should read --20--;
Column 17, line 43, "sensing means comprising image detection means carried by said first repeat phase moving and second manipulator hand means" should read: --first repeat phase moving and sensing means comprising image detection means carried by said second manipulator hand means--.

Signed and Sealed this

Twentieth Day of September 1983

[SEAL]

Attest:

GERALD J. MOSSINGHOFF

Attesting Officer

Commissioner of Patents and Trademarks